Oct. 29, 1963 H. S. SEITZ 3,108,567
SCHEDULE DISPLAY BOARD
Filed July 25, 1961
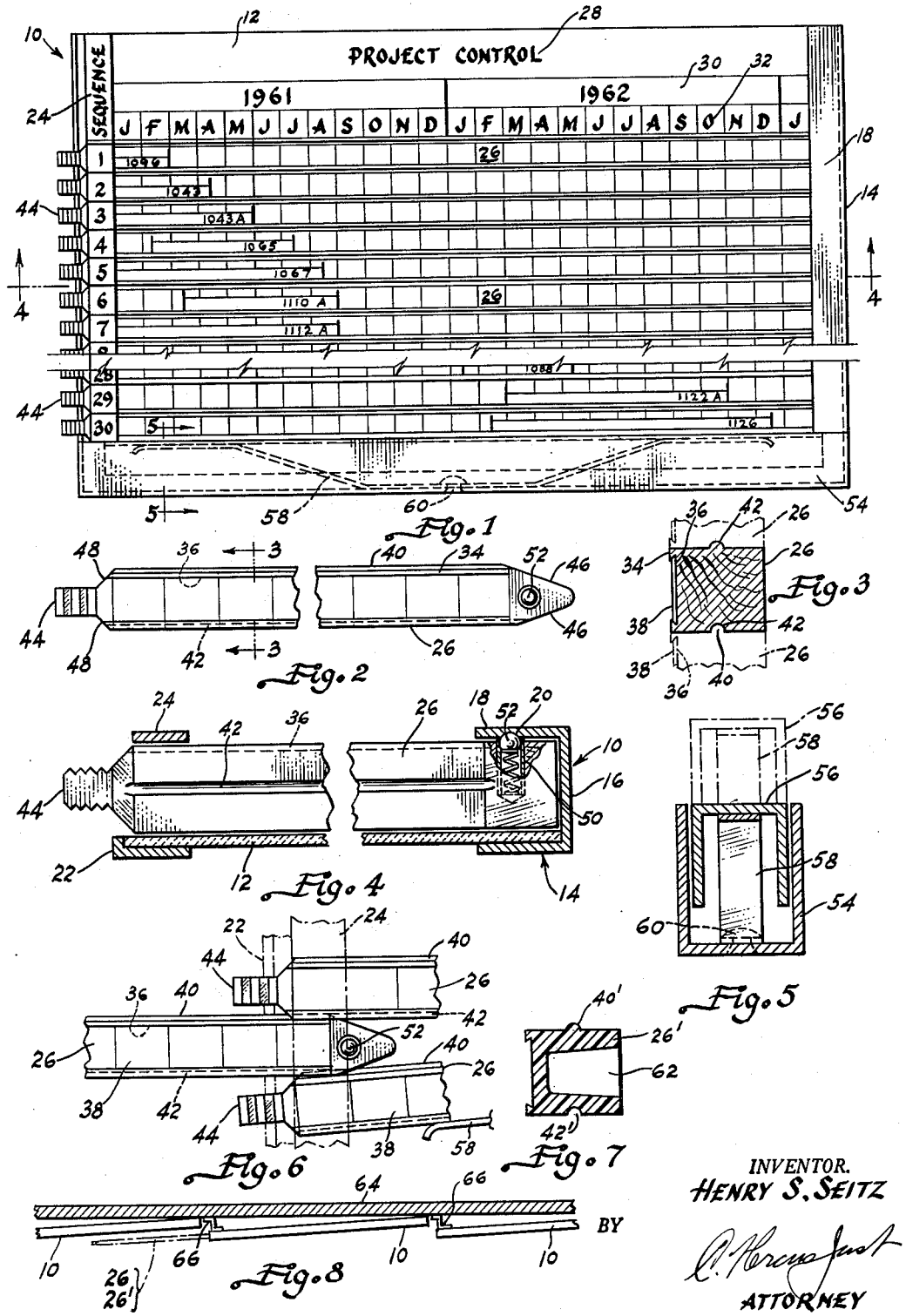
INVENTOR.
HENRY S. SEITZ
BY
ATTORNEY

United States Patent Office 3,108,567
Patented Oct. 29, 1963

3,108,567
SCHEDULE DISPLAY BOARD
Henry S. Seitz, R.D. 1, Felton, Pa.
Filed July 25, 1961, Ser. No. 126,546
4 Claims. (Cl. 116—135)

This invention relates to a schedule display board and, more particularly, to a schedule display board in which convenient means are provided for removing and replacing individual schedule indication strips, as compared with schedule boards presently in use.

The principal object of the present invention is to provide a schedule display board having means particularly arranged for permitting the withdrawal of the supporting means for an individual schedule strip, for example, and also means operable to move upwardly all of the remaining schedule strips and their supporting means below the one just removed. Thus, the schedule strip upon the removed supporting member may be taken therefrom and replaced with a blank schedule strip, for example, following which said supporting member and blank schedule strip is ready for reception of a new schedule and, while awaiting its turn to be used, it may be quickly and readily replaced upon the schedule display board, preferably adjacent the lower portion thereof, for example below the lowest current schedule still being utilized upon the schedule display board.

A further object of the invention is to provide manually engageable means at one end of each supporting means for the schedule strips, said manually engageable means preferably projecting beyond one edge of the base means of the schedule display board, whereby the individual supporting means and schedule strips thereon readily may be engaged and removed or replaced in any desired position upon the base means of the schedule display board.

Another object of the invention is to provide guideways adjacent opposite edges of the base means of the schedule display board, said guideways being capable readily of permitting vertical movement of the individual supporting members and schedule strips thereon, incident to removal and replacement of individual supporting means and schedule strips, relative to the base means of the schedule display board.

Still another object of the invention is to provide readily releasable latching or locking means whereby accidental removal of any individual supporting member and schedule strip thereon may be prevented in a direction parallel to the plane of the schedule board and laterally from one side edge thereof, but such latching means do not prevent vertical movement of the supporting members and schedule strips, relative to the guideways supporting the same upon the base means of the schedule display board.

A still further object of the invention is to provide means upon the individual supporting members and schedule strips having a cam-like action and rendering the same readily capable of being inserted between pairs of supporting members and schedule strips already mounted upon the schedule display board.

Details of the invention and the foregoing objects, as well as other objects thereof, are set forth in the following specification and illustrated in the accompanying drawing comprising a part thereof.

In the drawing:

FIG. 1 is a vertically foreshortened front elevation of a schedule display board embodying principles of the present invention, part of the board, intermediately of its top and bottom, being broken away, as indicated by broken lines in the figure.

FIG. 2 is an enlarged front view, longitudinally foreshortened, of an individual supporting bar for a schedule strip embodying the principles of the present invention.

FIG. 3 is a vertical section taken on the line 3—3 of FIG. 2, shown on the slightly larger scale than in said figure, and illustrating details of guide means between adjacent, insertable support bars for schedule strips, said view showing, in phantom, fragmentarily illustrated portions of other insertable support bars, respectively above and below the sectionally illustrated bar.

FIG. 4 is an enlarged longitudinally foreshortened sectional view, taken on the line 4—4 of FIG. 1, and illustrating details of the display board and, particularly, the guideways thereof which releasably hold the individual, insertable support bars for the schedule strips and also showing a preferred embodiment of latching or locking means for releasably holding said bars in operative position relative to the guideways and base means of the display board.

FIG. 5 is a sectional elevation taken on the line 5—5 of FIG. 1, and utilizing a somewhat larger scale than employed in FIG. 1, to illustrate details of follower means, the follower being illustrated in one position in full lines in said figure, and, in phantom, being shown in an exemplary, elevated position.

FIG. 6 is an enlarged fragmentary, front view illustrating, in exemplary fashion, the manner in which one schedule strip support bar is inserted into operative position between two adjacent bars.

FIG. 7 is a sectional view similar to FIG. 3, but illustrating still another embodiment of insertable support bar for schedule strips, the same preferably being extruded, or otherwise molded, from synthetic resin, or other suitable material.

FIG. 8 is an exemplary and fragmentary top plan view illustrating, on a small scale, a plurality of schedule boards embodying the present invention and showing additional support means by which a plurality of said boards may be mounted in side-by-side relationship and permit the removal and insertion of schedule support bars laterally from the one edge of each individual schedule board, without interference from an adjacent schedule board.

Referring to the drawing, and particularly FIG. 1, it will be seen that the schedule display board 10 embodying the principles of the present invention preferably comprises a planar base member or means 12, which may preferably be relatively thin and can be formed from any suitable material, such as pressboard, plywood, appropriate sheet metal, such as aluminum, steel, and the like, or synthetic resin. Said base means 12 is adapted to be mounted vertically, for example, upon the wall of a control office of the scheduling director of a plant, or the like, or said base member, if desired, may be mounted horizontally. If of sufficiently small size, for example, it may be mounted either upon a desk or table top, upon a desk slide, or the same may be suspended vertically from one or more suitable eyelets formed centrally or otherwise in the upper edge thereof for suspension from one or more hooks, nails, or the like, especially in regard to the invention being employed as a hospital chart, menu board, price list, or the like. Therefore, it is to be understood that the invention is not to be restricted in size or materials relative to the exemplary descriptions set forth above.

The base member 12 is provided adjacent opposite, parallel edges thereof with guideways. One of said guideways comprises a channel member 14 having one flange connected by any suitable means, such as rivets, or the like, to the base member 12. Said channel has a bottom 16, which is utilized for purposes to be described, and the opposite flange 18 from that which is connected to base member 12 preferably is provided on the inner surface thereof with a latch groove 20 extending longitudinally thereof.

The opposite edge of the base member 12 is provided also with a second guideway comprising channel-forming means including a rear member 22, which is fastened by any suitable means to base member 12. Parallel to and spaced from rear member 22 is a strip-like retaining member 24, which preferably is spaced from what will normally be the forward surface of base member 12 a distance substantially equal to that which the opposite flange 18 of channel 14 is spaced from base member 12.

Channel 14, rear member 22 and retaining member 24 preferably are all formed from similar material which, for example, may be either rolled or extruded metal, molded synthetic resin, or suitably formed wooden members having rigidity sufficient to maintain their shape when serving as guideways to receive the insertable support bars 26, details of which will now be described.

It will be understood that the upper portion of the base member 12 is provided with any suitable heading member 28, together with appropriate bars or strips 30 and, for example, additional indicating bars or strips 32, such as those shown in FIG. 1, upon which letters respectively identifying the month and year are inscribed. Preferably, the forward surfaces of the indicating strips or bars 30 and 32 are substantially flush with the front faces 34 of the support bars 26.

Support bars 26, on their front faces 34, are provided with grooves 36, see FIG. 3, within which, for example, schedule strips 38, of paper or the like, may be inserted. It will be seen from FIG. 3 that the groove 36 has undercut, longitudinal edges, so as readily to engage and hold the strips 38. If preferred, however, the strips 38 may utilize cement, either pressure-sensitive or otherwise, for purposes of securing the strips, preferably detachably, within the grooves 36. Also, the bars 26 preferably are provided with guide means on their upper and lower surfaces, which respectively interfit with corresponding or complementary guide means on adjacent bars above and below any individual bar 26, whereby the bars 26, to a large extent, tend to guide and support each other against displacement, relative to each other. Exemplary guide means of the type referred to are illustrated in FIGS. 2 through 4 and 6, wherein it will be seen that the upper surface of the bars, for example, are provided with ribs 40, while the lower surfaces of the bars are provided with grooves 42, which are complementary to the ribs 40.

The bars 26 preferably are slightly longer than the width of the base member 12 and the guideways at opposite edges thereof, whereby extensions 44, which preferably comprise finger-grip means, extend beyond one edge of the base member 12, thus affording ready access to any individual bar 26 for insertion or withdrawal of the same, relative to the display board. If desired, the extensions 44 may be serrated, or otherwise roughened, to facilitate gripping the same.

The opposite ends of the bars 26 preferably have tapered surfaces 46 and, adjacent the extensions 44, additional cam-like sloping surfaces 48 are provided, so as to readily be engageable by the pointed, opposite ends of the bars 26, in a manner somewhat as illustrated in FIG. 6, to facilitate the ready insertion of any individual bar 26 between two adjacent bars 26.

Either of the ends of the bar 26 may be provided with latching means for releasably locking or latching the bars in operative position relative to the guideways at the opposite edges of the base member 12. In the specific embodiment illustrated in the drawing, suitable latch means 50 are mounted within the pointed end of the bars 26, such exemplary latch means comprising a spring-pressed ball 52, the outer projecting portion of which is received within the latch groove 20 of flange 18 of the channel 14. It is to be understood, however, that the groove 20 might be formed within the inner surface of retaining member 24, or within base member 12, for example, whereupon the latch means 50 would be mounted in the opposite end of the bars 26, all within the spirit of the invention.

As described above, any individual bar 26 selectively may be withdrawn from the left-hand end of the board, and within the plane thereof, as viewed in FIG. 1. For example, at the completion of an individual schedule, the bar 26 containing the schedule strip for that particular schedule is removed and the schedule strip is either destroyed or filed. Usually, it is desired that all active schedules be positioned upon a schedule board, in succeeding order, with no blank schedule strips appearing therebetween. Hence, in accordance with the present invention, when one of the schedule bars 26 is removed from the board, follower means are provided automatically to push upwardly the other bars 26 which are below the removed bar 26, so as to place all of the active schedules in vertical succession relative to each other. Then, after an unused schedule strip, for example, has been applied to the removed bar 26, said bar may be replaced upon the schedule board at the bottom thereof, for example, or at any other location desired, by use of the cam-like means provided upon the bars to facilitate the insertion of any individual bar between two adjacent additional bars 26.

One preferred embodiment of follower means is illustrated in detail in FIGS. 1 and 5. The lower portion of the display board 10 comprises another channel 54, the outer flanges of which are spaced apart preferably substantially equally with that of the flanges of channel 14, whereby the front and rear surfaces of all of the channels and similar members, at least those at the sides and bottom of the board, will be substantially flush with each other. Positioned slidably within channel 54 is follower channel 56, the same being inverted, relative to bottom channel 54, and the side flanges of channel 56 preferably freely slide relative to the side flanges of channel 54. Disposed between the two channels are suitable expansion means comprising any appropriate spring means, or the like, such as leaf spring 58.

Intermediately of the ends thereof, spring 58 may be secured to the base of channel 54 by any simple means, such as a rivet 60. The flexibility and shape of spring 58 is such as readily to permit the follower 56 to be moved vertically relative to bottom channel 54 of the display board a distance preferably greater than the vertical thickness of an individual schedule support bar 26, whereby, when one of the support bars 26 is removed, the strength of the spring 58 and contemplated movement of the ends thereof is sufficient to move, if necessary, the entire row of bars 26 vertically upward into engagement with each other and the indicating bars or strips 32 at the top of the display schedule board 10. However, the strength of the spring 58 is such that it will yield suitably when one of the bars 26 is to be inserted between a pair of adjacent bars, in the manner shown, for example, in FIG. 6.

Although one form of the schedule support bars 26 is contemplated as being formed from wood, for example, as shown especially in FIG. 3, it is to be understood that said bars may be formed, such as by molding, from other appropriate materials, such as synthetic resin, as diagrammatically illustrated in section in FIG. 7, or metal. In this embodiment, the bar 26' preferably is provided with a suitable guide rib 40' and guide groove 42' respectively on the upper and lower surfaces thereof, while the interior of the bar 26' is provided with a longitudinal recess 62, which is formed incident to the molding of the bar 26', thereby saving the cost of material, and, additionally, adding a certain amount of resilience to the bar relative to the upper and lower surfaces thereof and also lightening the weight thereof. Similarly, it is to be understood that rather than being formed from synthetic resin, the bar 26' also may be formed from die-cast metal, or the like, or from extruded aluminum, or the like, all within the spirit of the present invention.

As the individual bars 26 and 26' are to be inserted and removed from one edge of the board 10 within the plane thereof, and laterally from said edge, as illustrated in exemplary, top plan view in FIG. 8, suitable means are provided to permit a plurality of the schedule boards 10 being mounted in side-by-side relationship upon a wall 64, for example, so that the same will not interfere with each other, in regard to individual bars 26 and 26' being moved relative to any particular schedule board. To accomplish this, one edge of each board is spaced from the wall surface a distance at least substantially equal to the thickness of the board 10. Such mounting means, for example, may comprise any suitable form of spacing means, such as Z-bars 66, or the like. Z-bars are useful in that they afford an outwardly projecting flange capable of receiving attaching screws, nails, or the like. However, any suitable spacing bar, even wooden strips, may be used to space similar edges of a plurality of schedule boards, somewhat in shingle fashion, as viewed in plan view, such as shown in FIG. 8, so as to provide clearance between adjacent boards, incident to inserting or removing schedule support bars 26' relative to the boards 10.

From the foregoing, it will be seen that the present invention provides simple and effective, as well as efficient, means for permitting ready removability of any individual schedule strip from a schedule board, and reinsertion of the same upon the board, or insertion of a new schedule strip upon the board, as desired, coupled with automatically operable and effective means for moving some or all of the schedule support bars vertically, relative to the schedule board, so as to place all active schedules, for example, in successive relationship to each other, without blank schedules being interspersed therebetween. Effective latch means releasably secure all of the schedule support bars in operative relationship relative to the schedule board, and, thereby, prevent accidental removal of the bars from the board, except any particular bar which is to be removed, and such removal will not accidentally cause removal of any of the adjacent bars, due to such latch means. Still further, longitudinally extending guide means also are provided on the individual bars to facilitate further guidance between adjacent bars, thereby adding to the effective use of the schedule board comprising the present invention.

While the invention has been described and illustrated in its several preferred embodiments, and has included certain details, it should be understood that the invention is not to be limited to the precise details herein illustrated and described, since the same may be carried out in other ways falling within the scope of the invention as claimed.

I claim:
1. A schedule display board comprising base means having substantially parallel opposite sides, substantially parallel guideways carried by said base means respectively adjacent said opposite sides, a plurality of similar elongated insert bars arranged to have a schedule applied to one surface of each bar and of sufficient length to extend removably and slidably transversely between said guide means for support adjacent said base means and arranged with the schedule displaying surface outermost, one of said guideways being permanently outwardly open from the side of said base means to which it is connected and operable to permit the ready insertion and removal of said bars therethrough to and from parallel relationship between adjacent parallel bars extending between said guideways and said bars being slidably movable readily within said guideways in a direction longitudinally of said guideways, and resiliently urged follower means movably mounted at one end of said base means for movement against the lowermost bar in a direction parallel to said bars and toward the opposite end of said base means and operable to retain the bars remaining in said guideways in engagement with each other after the removal of one of said bars from said guideways.

2. The schedule display board set forth in claim 1 further including disengageable projecting detent locking means respectively on said bars coengageable with a complementary groove detent-receiving means fixed relative to said base means and operable to receive said detent locking means and retain said bars disengageably latched relative to said guideways and also permit movement of said detent means longitudinally of said groove.

3. The schedule display board set forth in claim 1 further having channel means extending along the lower portion of said base means transversely between said guideways, and said follower means being disposed within said channel means and comprising a member movable relative to said channel and resilient means between said member and channel means urging the member into engagement with the lowermost bar of said plurality of bars within said guideways to urge all of said bars into engagement with each other.

4. The schedule display board set forth in claim 3 further characterized by said follower being another channel inverted and slidable within said channel, and spring means mounted between said channels and operable to urge the same apart.

References Cited in the file of this patent
UNITED STATES PATENTS

| | | |
|---|---|---|
| 409,526 | Underhill | Aug. 20, 1889 |
| 774,694 | Post | Nov. 8, 1904 |
| 1,067,177 | Kinney | July 8, 1913 |
| 1,860,856 | Henke | May 31, 1932 |
| 2,903,808 | Anderson | Sept. 15, 1959 |
| 3,033,156 | Vervish | May 8, 1962 |

FOREIGN PATENTS

| | | |
|---|---|---|
| 773,120 | France | Aug. 27, 1934 |
| 792,313 | Great Britain | Mar. 26, 1958 |